United States Patent [19]

Wood

[11] Patent Number: 4,714,262
[45] Date of Patent: Dec. 22, 1987

[54] VARIABLE LENGTH TIE ROD ASSEMBLY

[75] Inventor: Ruey E. Wood, St. Clair Shores, Mich.

[73] Assignee: TRW Inc., Lyndhurst, Ohio

[21] Appl. No.: 875,104

[22] Filed: Jun. 17, 1986

[51] Int. Cl.$^4$ .............................................. B62D 7/16
[52] U.S. Cl. .................................. 280/95 R; 74/586; 403/377
[58] Field of Search ............. 280/95 R, 95 A; 74/586; 403/377

[56] References Cited

U.S. PATENT DOCUMENTS

| | | | |
|---|---|---|---|
| 2,372,705 | 4/1945 | Bicker | 254/86 |
| 3,301,572 | 1/1967 | Tapp et al. | 280/95 R |
| 3,887,211 | 6/1975 | Mazur | 280/95 R |
| 3,938,822 | 2/1976 | Guerriero | 280/95 R |
| 3,988,818 | 11/1976 | Allison | 280/95 R |

FOREIGN PATENT DOCUMENTS 505020 12/1954 Italy ...................................... 74/586

Primary Examiner—John J. Love
Assistant Examiner—Ross Weaver
Attorney, Agent, or Firm—Tarolli, Sundheim & Covell

[57] ABSTRACT

A variable length tie rod assembly includes a tie rod and a ball and socket assembly. The ball and socket assembly has a socket housing with a ball stud disposed in the socket housing. A tie rod extends into the socket housing. The variable length tie rod assembly includes adjustment means for effecting relative movement between the ball and socket assembly and the tie rod. The adjustment means includes a pinion rotatably mounted in the socket housing. The pinion has teeth disposed in meshing engagement with teeth formed in one end portion of the tie rod. The pinion is rotatable relative to the socket housing to effect axial movement of the tie rod relative to the socket housing.

3 Claims, 7 Drawing Figures

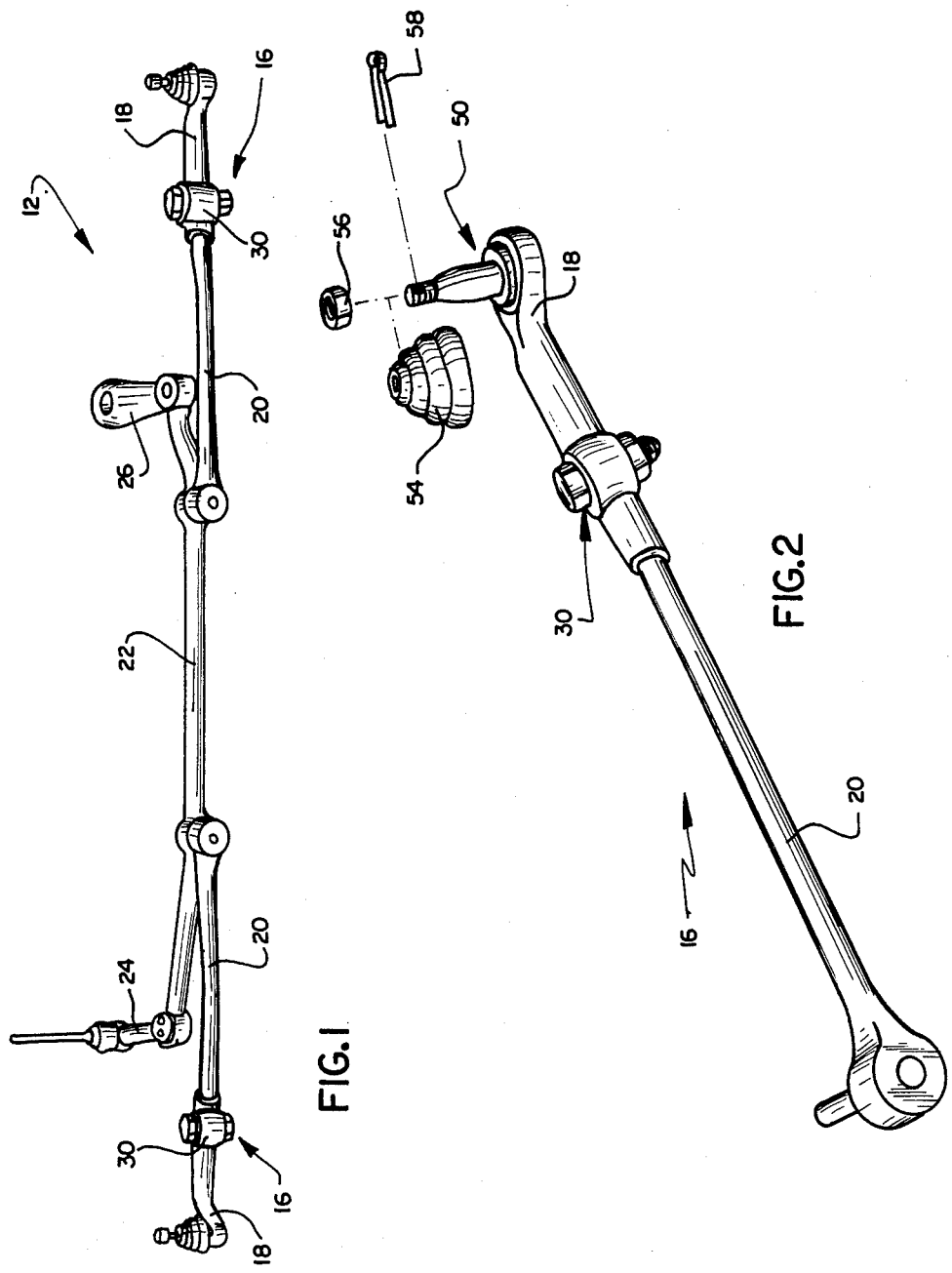

VARIABLE LENGTH TIE ROD ASSEMBLY

BACKGROUND OF THE INVENTION

The present invention relates to a link assembly having an adjustable length and, more specifically, to a variable length tie rod assembly.

A current commercial tie rod assembly includes a tie rod and a ball and socket assembly. The tie rod is threaded into a portion of the socket assembly. By rotating the tie rod relative to the socket assembly, the length of the assembly can be adjusted. A jam nut threaded on the tie rod clamps against the socket to resist separation of the tie rod and ball and socket assembly. A clamp mechanism clamps the socket around a portion of the tie rod.

In the known tie rod assembly, the jam nut sometimes becomes loose, which can result in misadjustment of the tie rod assembly length. Thread failure of the tie rod or the socket can also occur due to corrosion, and can result in separation of the tie rod and socket. Thread engagement problems between the tie rod and socket can result from thread size variation and from thread damage during handling. Tie rod thread damage during handling can necessitate rethreading the tie rod. Further, threading the socket is a somewhat troublesome manufacturing operation.

Another problem with the known tie rod assembly can occur during its adjustment. Upon relative rotation of the tie rod and the ball and socket assembly, the ball and socket assembly may windup or pinch the bellows, or dust cover. Contaminants can then enter the ball and socket joint and lubricant can be lost, both of which contribute to accelerated wear of the joint.

SUMMARY OF THE INVENTION

The present invention is an improved link assembly of adjustable length and particularly an improved variable length tie rod assembly. The tie rod assembly includes a tie rod and a ball and socket assembly. The ball and socket assembly includes a socket housing having a portion which defines a chamber in which one end of a tie rod is disposed. The end of the tie rod disposed in the socket housing has a plurality of teeth which form a rack or has teeth formed by a screw thread or the like which extends around the circumference of the tie rod. A pinion is rotatably supported by the socket housing. The pinion has teeth which mesh with the teeth on the tie rod.

To effect adjustment of the tie rod assembly, the pinion is rotated. Rotating the pinion causes the tie rod and socket housing to move axially relative to one another. This adjusts the length of the tie rod assembly. Once the tie rod assembly has been adjusted, the socket housing is clamped against the tie rod to resist further axial relative movement of the tie rod and socket housing.

A tie rod assembly in accordance with the present invention has no adjusting threads on the tie rod or the socket that can become corroded or damaged. There also is no jam nut that can loosen. Furthermore, the length of the tie rod assembly is adjusted without rotating the tie rod or ball and socket assembly. Thus, the present invention is an improvement over the aforementioned commercial tie rod assembly and is not subject to the aforementioned problems.

BRIEF DESCRIPTION OF THE DRAWINGS

Further features of the present invention will become apparent to those skilled in the art to which the present invention relates from a reading of the following specification made with reference to the accompanying drawings, in which:

FIG. 1 is a schematic perspective view of a linkage used in a vehicle steering mechanism and having a pair of tie rod assemblies constructed in accordance with the present invention;

FIG. 2 is an enlarged perspective and partially exploded view illustrating one of the tie rod assemblies of FIG. 1;

DESCRIPTION OF A PREFERRED EMBODIMENT

Figure 3:
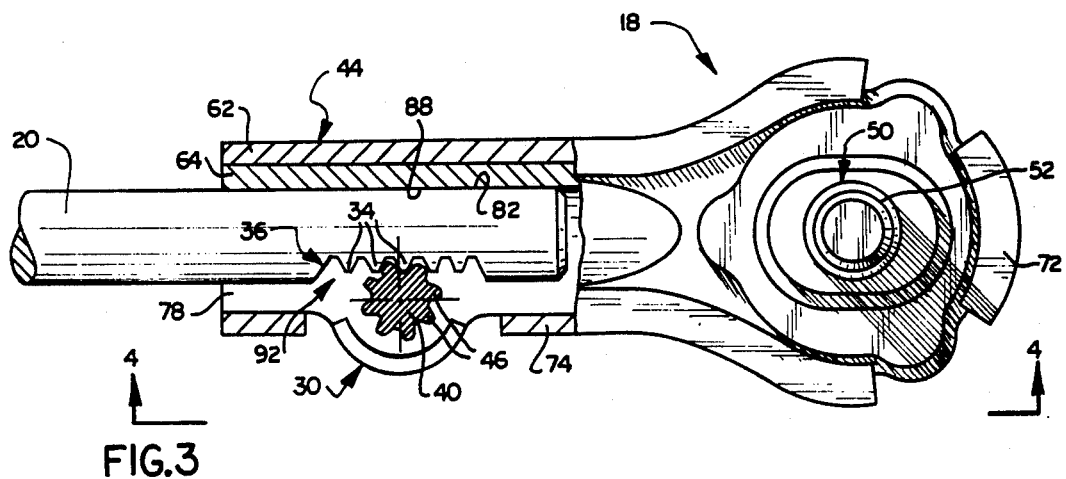
FIG. 3 is an enlarged plan view, partially in section, of a portion of the tie rod assembly of FIG. 2.

The present invention is an adjustable link assembly and may be embodied in various constructions. The present invention is shown in FIG. 1 as embodied in a linkage 12. The linkage 12 is used in a steering mechanism to turn the steerable wheels of a vehicle. The linkage 12 includes a pair of variable length tie rod assemblies 16.

Each tie rod assembly 16 includes a ball and socket assembly 18 which is adapted to be connected to a front wheel spindle (not shown) of a vehicle. Each tie rod assembly 16 also includes a tie rod 20 pivotally connected to an intermediate portion of a center link 22. The center link 22 is connected at one end to an idler arm 24 which is pivotally mounted on the vehicle frame (not shown). The opposite end of the center link 22 is connected to a pitman arm 26 which is also pivotally mounted to the vehicle frame, as is known.

Figure 4:
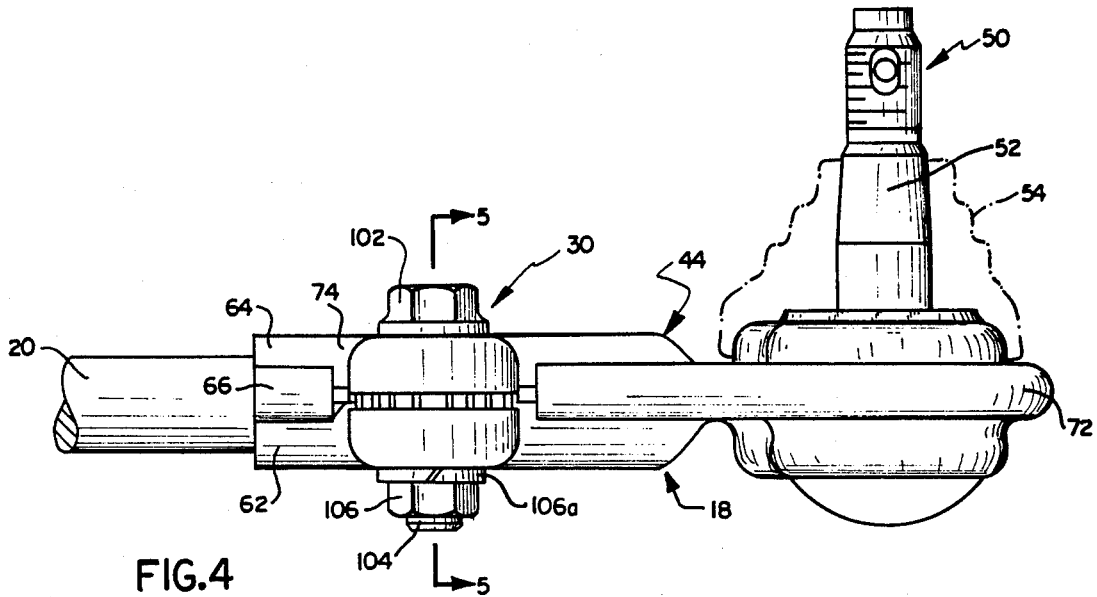
FIG. 4 is a side elevational view taken along the line 4—4 of FIG. 3.

The ball and socket assembly 18 (FIG. 4) includes a ball stud 50. The ball stud 50 has a ball end (not shown) disposed in the socket housing 44. A shank 52 is connected to the ball end and extends away from the socket housing 44. A dust cover, 54 (FIGS. 2 and 4) is received on the ball stud 50 and on the socket housing 44. A nut 56 (FIG. 2) and a cotter pin 58 are used to retain the ball stud 50 in the front wheel spindle (not shown).

Figure 5:
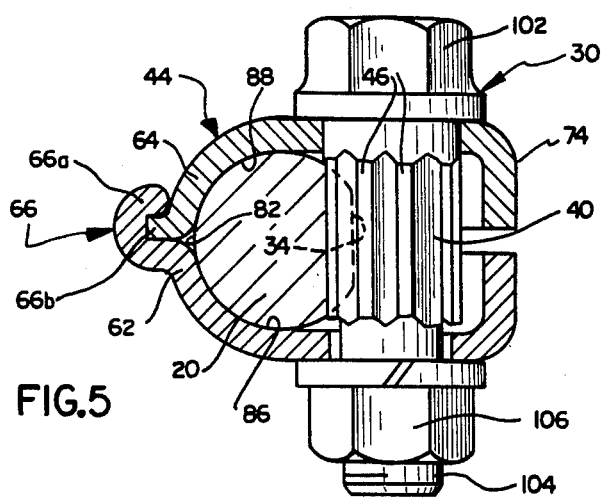
FIG. 5 is an enlarged cross sectional view taken along line 5—5 of FIG. 4.

The socket housing 44 (FIG. 4) includes a base section 62 and a cover section 64. The base and cover sections 62 and 64 are made from stamped steel and interconnected at a joint 66 (FIGS. 4 and 5) which extends around the perimeter of the socket housing 44. The joint 66 comprises a portion 66a of base section 62 which is bent over a lip 66b of cover section 64.

The socket housing 44 (FIG. 4) has a ball stud mounting portion 72 and a tie rod mounting portion 74. The ball stud mounting portion 72 encloses the ball end of the ball stud 50. The ball stud mounting portion 72 supports the ball stud 50 for pivotal movement in a known manner similar to that disclosed in U.S. Pat. No. 2,910,316. The tie rod mounting section 74 has a generally cylindrical chamber 78 (FIG. 3) in which an end portion of the tie rod 20 is internally received.

The tie rod assemblies 16 are adjustable in length. Adjusting the length of a tie rod assembly adjusts the "toe" setting of the associated wheel. The "toe" setting represents the angle (looking from above the vehicle) of the wheel relative to the direction of vehicle travel.

Each tie rod assembly 16 (FIG. 2) has an adjustment mechanism 30 for moving a tie rod 20 relative to a ball and socket assembly 18 to adjust the length of the tie rod assembly. A plurality of teeth 34 (FIGS. 3 and 5) form a rack 36 on the tie rod 20. Alternatively, the teeth 34 could be portions of a screw thread which extends circumferentially around the tie rod 20. A pinion 40 is rotatably supported by the socket housing 44. Teeth 46 of the pinion 40 are in meshing engagement with the teeth 34 of the tie rod 20. Rotation of the pinion 40 applies a force to the tie rod teeth to axially move the tie rod relative to the socket housing 44.

The socket housing 44 supports the tie rod 20 for sliding movement relative thereto and prevents disengagement of the tie rod teeth from the pinion 40. A cylindrical outer surface 82 (FIG. 3) of the tie rod 20 slides along an arcuate inner surface 86 (FIG. 5) of the base 62 and an arcuate inner surface 88 of the cover 64.

The pinion 40 (FIG. 6) is rotatably supported by the tie rod mounting portion 74 of the socket housing 44. The pinion 40 is enclosed by the base and cover sections 62 and 64 (FIG. 5) to protect the teeth 46 from damage. The pinion 40 includes a head end portion 102 and a threaded end portion 104. The head end portion 102 may have a standard hex head configuration which can be gripped by a suitable tool. The threaded end portion 104 has a standard screw thread for accepting a nut 106 and a lock washer 106a.

The base and cover sections 62 and 64 are clamped against the tie rod 20 to hold the tie rod against axial movement relative to the socket housing 44 when the nut 106 is tightened on the threaded end portion 104 of the pinion 40. Tightening the nut 106 presses the arcuate inner surfaces 86, 88 against the cylindrical outer surface 82 of the tie rod 20.

Friction between the tie rod 20 and the arcuate inner surfaces 86, 88 of the base and cover holds the tie rod in place relative to the socket housing 44. Tightening the nut 106 on the threaded end portion 104 of the pinion 40 also prevents the pinion from rotating relative to the socket housing 44, which further holds the tie rod 20 against axial movement relative to the socket housing 44.

Figure 6:
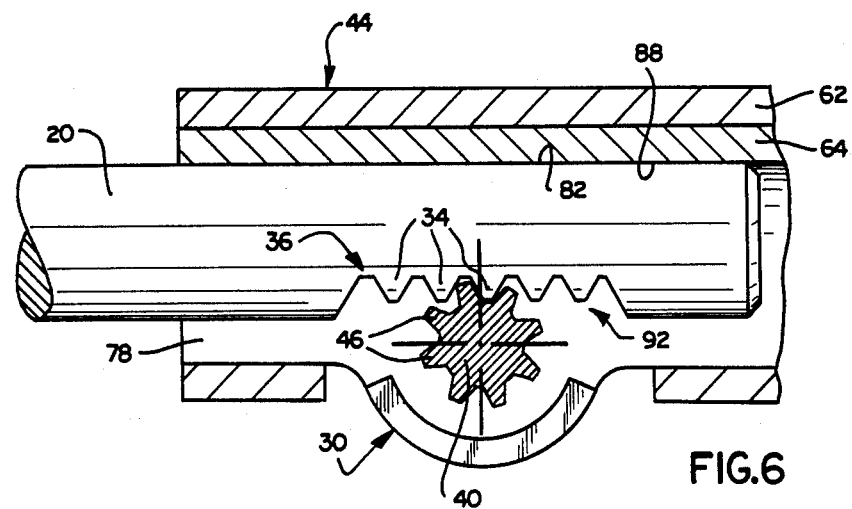
FIG. 6 is an enlarged cross sectional view of a portion of FIG. 3.

The tie rod 20 is illustrated in FIG. 6 in an initial, or centered, position relative to the socket housing 44. To adjust the tie rod assembly 16 from this initial position, the nut 106 (FIG. 5) must be loosened. This allows the pinion 40 to rotate. The pinion 40 (FIG. 6) is rotated clockwise (as viewed in FIG. 6) to decrease the length of the tie rod assembly 16. The pinion 40 is rotated counterclockwise (as viewed in FIG. 6) to increase the length of the tie rod assembly 16. To rotate the pinion 40, the head end portion 102 (FIG. 5) of the pinion 40 is rotated with a suitable tool. During rotation, forces are transmitted from the pinion 40 (FIG. 6) to the rack 36 in order to move the tie rod 20 axially relative to the socket housing 44.

Figure 7:
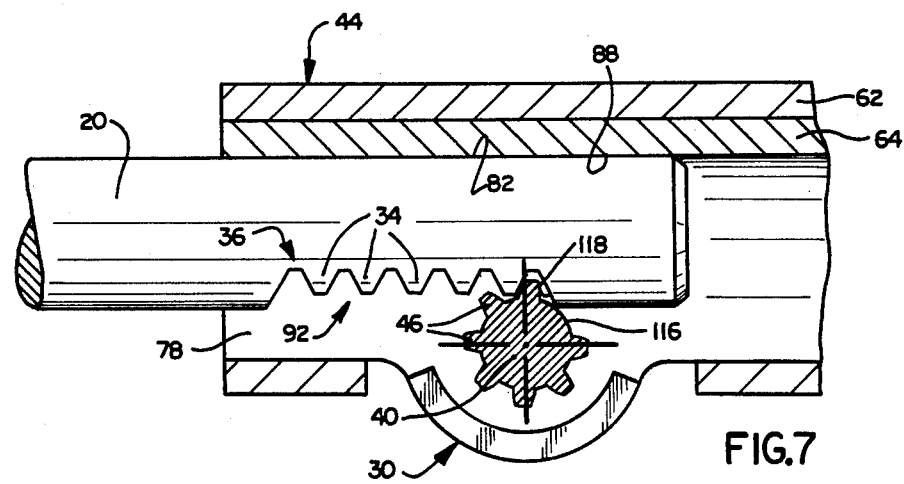
FIG. 7 is an enlarged cross sectional view, similar to FIG. 6, illustrating the parts under a different condition.

The pinion 40 has a body 116 (FIG. 7) from which the teeth 46 extend. The pinion 40 is mounted in the socket housing 44 so the body 116 will contact the end surface 118 on the tie rod 20. If any or all of the teeth 46 are stripped from the pinion 40, as illustrated in FIG. 7, the end surface 118 of the tie rod 20 will engage the body 116 of the pinion. Engagement of surface 118 with the body 116 blocks withdrawal of the tie rod 20 from the socket housing 44. Thus, disengagement of tie rod 20 from the socket housing 44 is blocked if one or more teeth 46 on the pinion 40 or teeth 34 on the tie rod 20 are broken away.

From the above it should be understood that the assembly of the present invention:

(1) does not require threading of the socket or the tie rod,
(2) does not require rethreading of the socket or the tie rod due to thread damage during handling,
(3) does not require a jam nut, and
(4) enables easy "toe" adjustment of the vehicle wheels.

From the above description of a preferred embodiment of my invention, those skilled in the art will perceive improvements, changes and modifications and such improvements, changes and modifications within the skill of the art are intended to be included herein and covered by the spirit and scope of the hereinafter appended claims.

Having described a preferred embodiment, the following is claimed:

1. An assembly comprising:
   a tie rod having an end portion with teeth formed thereon;
   a ball and socket assembly comprising a ball stud and a socket housing, said socket housing having a first housing portion for receiving said ball stud and a second housing portion for receiving said end portion of said tie rod;
   a pinion having a plurality of teeth for engaging said teeth formed on said end portion of said tie rod and rotatable to effect relative axial movement between said socket housing and said tie rod;
   said second housing portion having means for supporting said pinion for rotation relative thereto to effect said relative axial movement between said socket housing and said tie rod; and
   means disposed adjacent opposite axial ends of said pinion for applying force against opposite portions of said second housing portion to press said opposite portions of said second housing portion against said tie rod to hold said tie rod against axial movement relative to said socket housing and to simultaneously lock said pinion against rotation, said force applying means being releasable to relieve said opposite portions of said second housing portion from pressing on said tie rod and to enable rotation of said pinion to effect axial adjustment between said tie rod and said socket housing.

2. An assembly as set forth in claim 1 wherein said pinion has teeth projecting from a body and said tie rod includes a surface for engaging said body of said pinion to block axial movement of said tie rod from said socket housing.

3. An assembly as set forth in claim 1 wherein said socket housing comprises base and cover sections defining said opposite sides, said cover section including a lip received in a portion of said base section to interconnect said base and cover sections, and said force applying means comprises a head end portion of said pinion engageable with an outer surface of one of said base and cover sections, a threaded end portion projecting beyond the other of said base and cover sections and a nut for threadingly engaging said threaded end portion of said pinion and engageable with an outer surface of the other of said base and cover sections.

* * * * *